United States Patent [19]
Tremblay

[11] Patent Number: 5,368,399
[45] Date of Patent: Nov. 29, 1994

[54] ADJUSTABLE BEARING ASSEMBLY

[75] Inventor: Clement Tremblay, Citrus Heights, Calif.

[73] Assignee: Tri Tool Inc., Rancho Cordova, Calif.

[21] Appl. No.: 142,070

[22] Filed: Oct. 20, 1993

[51] Int. Cl.⁵ .............................................. F16C 19/26
[52] U.S. Cl. ................... 384/583; 384/255; 384/565; 384/571
[58] Field of Search ............... 384/583, 519, 255, 559, 384/565, 571

[56] References Cited

U.S. PATENT DOCUMENTS

| | | |
|---|---|---|
| 3,661,431 | 5/1972 | Wisecarver . |
| 4,011,670 | 3/1977 | Hutchings et al. . |
| 4,366,944 | 1/1983 | Yoshioka ........................ 384/255 |
| 4,397,202 | 8/1983 | Mayfield et al. . |
| 4,418,591 | 12/1983 | Astle . |
| 4,665,782 | 5/1987 | Vanderpol . |
| 4,739,685 | 4/1988 | Ricci . |
| 4,754,672 | 7/1988 | Vanderpol . |
| 4,770,074 | 9/1988 | Kwech . |
| 4,829,860 | 5/1989 | Vanderpol . |
| 4,939,964 | 7/1990 | Ricci . |
| 5,054,342 | 10/1991 | Swiatowy et al. . |
| 5,286,119 | 2/1994 | Fischer ............................. 384/583 |

OTHER PUBLICATIONS

Literature by Master Machine Tools, Inc., of Hutchinson, Kansas, Roller Trac Division, on "VT series rotary bearing tables", p. 20 (Oct. 1993).
A Brochure of Bishop-Wisecarver Corp., of Pittsburg, Calif., "The DUA-L-VEE System", 1981.
A brochure of Osborn Manufacturing, Washington, entitled "Load Runners" (No date).
A literature sheet by Torrington, disclosing eccentric bushings (No date).

Primary Examiner—Lenard A. Footland
Attorney, Agent, or Firm—Bacon & Thomas

[57] ABSTRACT

An adjustable roller bearing assembly adapted for use in a machine tool includes an elongated support bolt that rotatably supports a radially extending roller bearing, and a bushing adapted to be positioned within a bore of a support member and to which the bolt member can be threadably secured. The bushing includes an outer cylindrical portion adapted to be snugly received within a bore of a support member and a cylindrical through hole through which the bolt extends. The outer cylindrical surface of the bushing is eccentric with respect to a central longitudinal axis of the bushing so that the roller bearing and its associated support bolt can be radially adjusted relative to the support member by rotation of the bushing within the bore. The bushing is a one piece integrated sleeve, flange and threaded connector so that only the support bolt and bushing are needed to both clamp the bearing on the support and radially adjust the bearing position relative to the support.

11 Claims, 3 Drawing Sheets

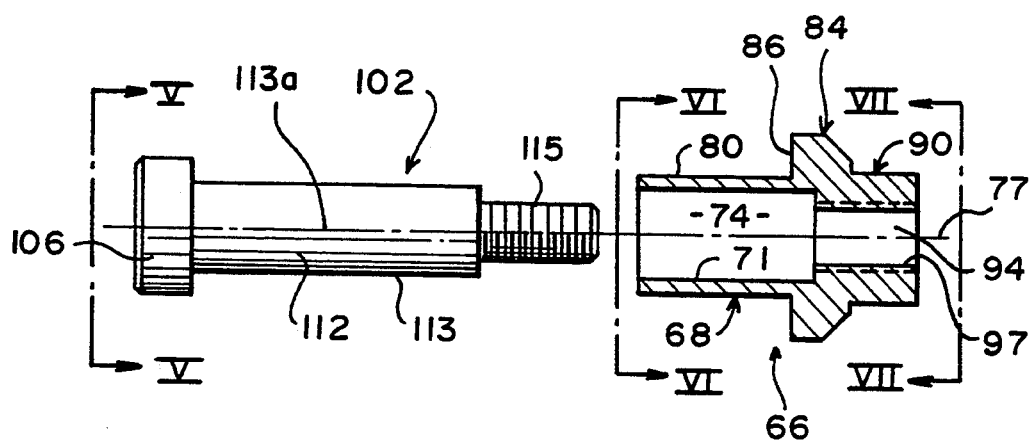
FIG. 4
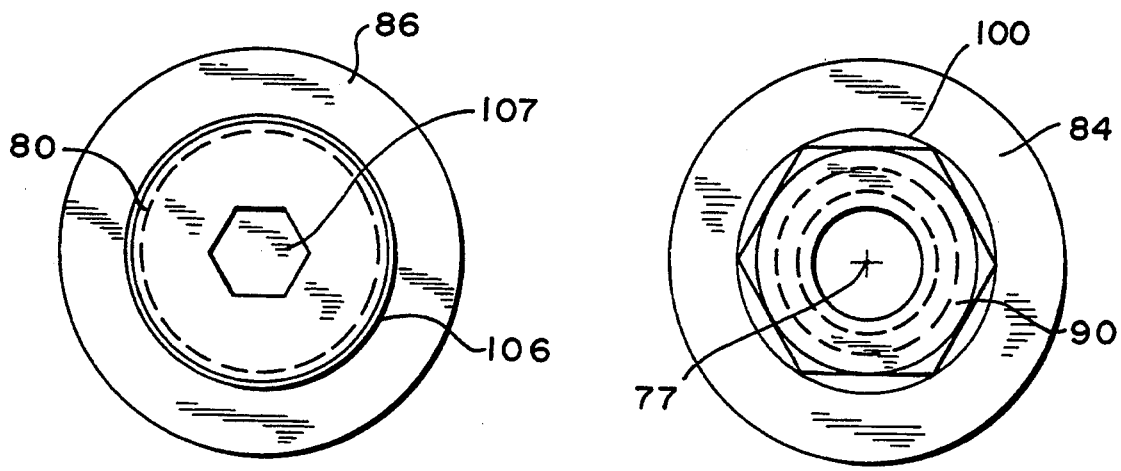
FIG. 5
FIG. 7
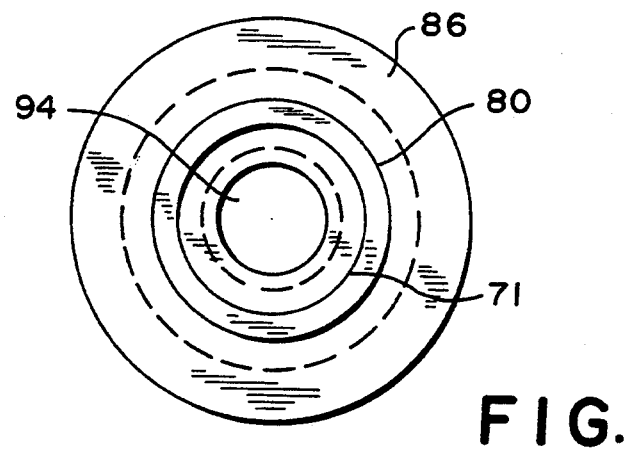
FIG. 6

5,368,399

ADJUSTABLE BEARING ASSEMBLY

BACKGROUND OF THE INVENTION

1. Field of the Invention

The present invention pertains to the art of adjustable roller bearings and, more particularly, to an adjustable roller bearing assembly for use in a machine tool.

2. Discussion of the Prior Art

Portable lathe type machine tools for use in machining pipes or other workpieces are widely known in the art. Such a lathe generally includes a first ring or frame member that is adapted to be fixedly secured about or onto a workpiece and a second ring member that is rotatable supported by the first ring member. The second ring member carries a tool carrier having a head adapted to receive and support a cutting tool element. The tool element can be advanced during operation of the lathe in order to perform a desired machining operation on the workpiece.

Various bearing arrangements are provided between tile relatively rotatable ring members of portable lathes, including sliding and roller type bearings. Sliding type bearings are exemplified by U.S. Pat. Nos. 4,754,672 and 4,665,782 which are both assigned to the assignee of the invention described herein. A roller type bearing is exemplified by U.S. Pat. No. 4,418,591 also assigned in common with the assignee of this invention. It is highly desirable in such bearing arrangements to make the bearings conveniently replaceable when they are damaged or worn, but more importantly it is highly desirable to make them adjustable to remove undesirable clearances and to equalize loading among the bearing elements. The ability to adjust the bearings enables one to compensate for wear of the bearings as well as manufacturing tolerances.

Various approaches have been made to provide adjustable roller bearing systems between the relatively rotatable elements of a portable lathe. U.S. Pat. No. 4,397,202, for example, discloses rotary bearing elements between the frame and a rotatable head of a portable lathe wherein the bearing elements are inclined relative to the axis of rotation of the rotatable head and are individually adjustable for rotation within a shaped trackway. U.S. Pat. No. 5,054,342 provides another example of an adjustable roller bearing arrangement between the rotatable tool carrying head of a portable lathe and the frame of the lathe. In accordance with U.S. Pat. No. 5,054,342, the position of individual roller bearings may be adjusted by an eccentric incorporated in a bolt element extending between the rotatable head and the frame of the portable lathe, and which also supports each roller bearing element. By releasing a threaded fastener engaging the bolt and rotating the eccentric stud, the radial position of the roller bearing may be adjusted relative to the fixed frame or the rotatable tool carrying head.

The broader concept of adjusting the position of a roller constituting part of a series of roller bearing elements to take up slack or remove clearances by providing an eccentric adjusting element on at least one of the bearing elements is well known in the art as exemplified by U.S. Pat. No. 3,661,431. FIG. 4, for example, of U.S. Pat. No. 3,661,431 illustrates an eccentric bushing that may be rotated to adjust the radial position of a roller element relative to a central shaft carrying the roller bearing and bushing. U.S. Pat. No. 4,011,670 shows still another arrangement for adjusting the position of a roller element relative to a fixed frame utilizing a support rod having an eccentric portion located at the location where the roller is mounted on the rod.

While the prior art adjustable roller bearing arrangements provide desirable adjustability of the position of the roller elements relative to the race or tracks with which they are associated, it is highly desirable to simplify the components required in an adjustable bearing arrangement by reducing the number of elements constituting the roller bearing support to thereby reduce inventory of parts required to manufacture the adjustable bearing assembly and to simplify the methodology by which the position of the bearings is adjusted after the bearings have been incorporated an a complete system, for example a machine tool such as a portable lathe.

SUMMARY OF THE INVENTION

The present invention provides an adjustable roller bearing assembly particularly adapted for use in a machine tool and which utilizes a minimum number of components.

The present invention also provides an adjustable roller bearing assembly that includes an eccentric radial adjustment for roller bearing in the form of an eccentric bushing for supporting a bearing attaching bolt that secures the bearing to its support. The bushing includes an integrated fastener element for tightening the bolt and for locking the adjustable bushing in place relative to its support.

Other features and advantages of the bearing assembly of the present invention will become more readily apparent from the following detailed description of a preferred embodiment thereof when taken in conjunction with the following drawings wherein like reference numerals refer to corresponding parts in the several views.

BRIEF DESCRIPTION OF THE DRAWINGS

FIG. 4 is an exploded view generally of a portion of the bearing assembly of the present invention;

FIG. 5 is a cross-sectional view generally taken along line V—V of FIG. 4;

FIG. 6 is a cross-sectional view generally taken along line VI—VI of FIG. 4; and FIG. 7 is a cross-sectional view generally taken along line VII—VII of FIG. 4.

DETAILED DESCRIPTION OF A PREFERRED EMBODIMENT

Figure 1:
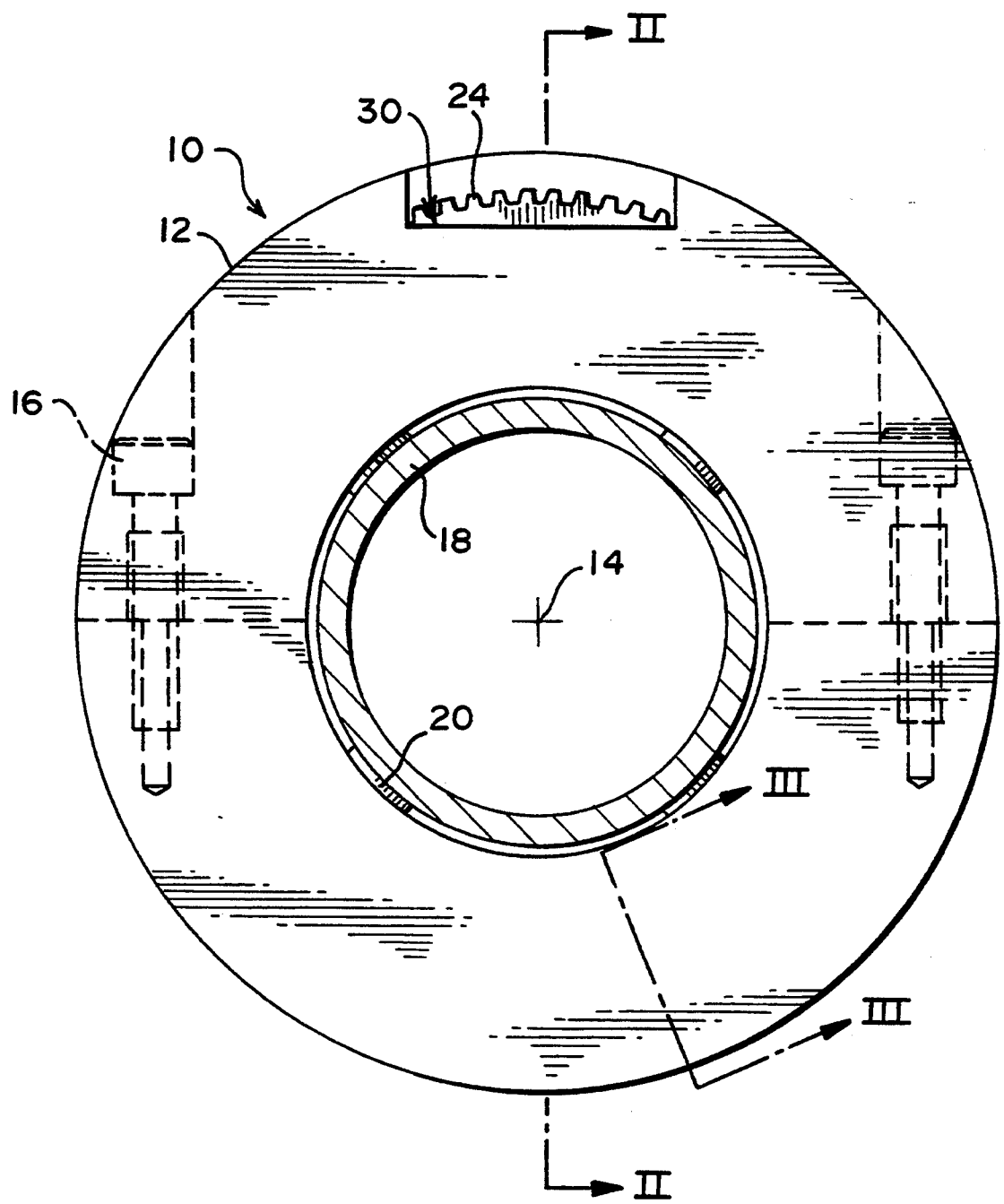
FIG. 1 depicts a rear elevational view of a portable lathe embodying the invention.
Figure 2:
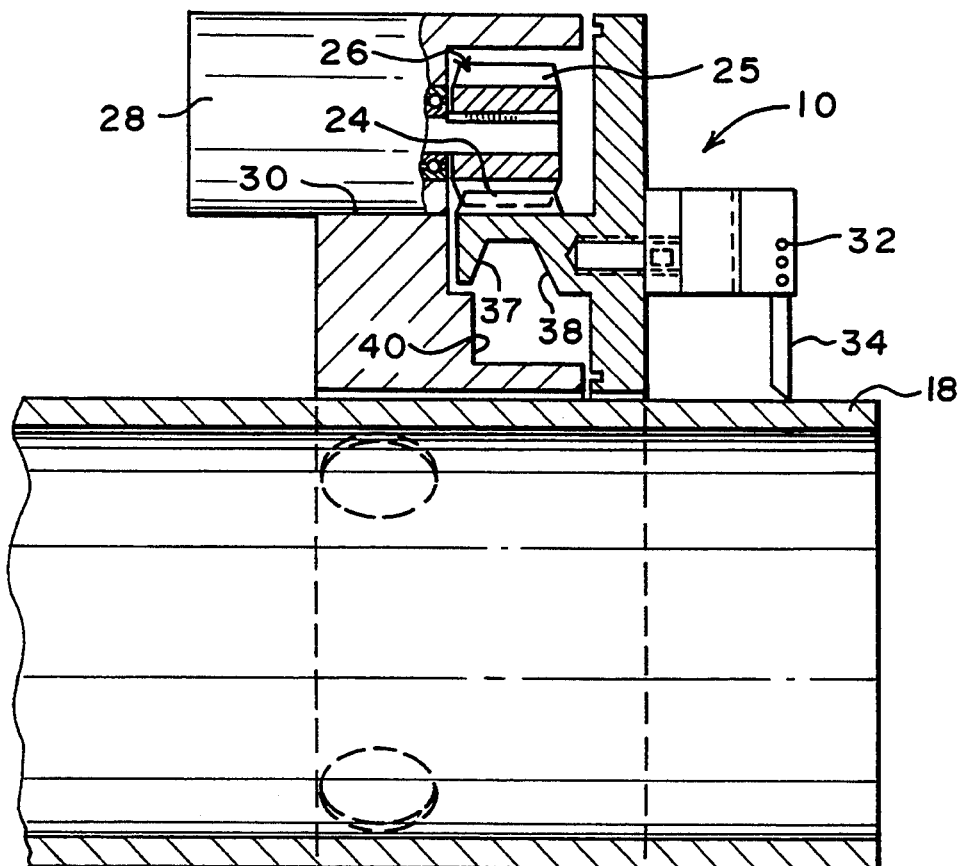
FIG. 2 is a cross-sectional view generally taken along line II—II of FIG. 1.

With initial reference to FIGS. 1 and 2, a machine tool in the form of a portable lathe embodying the present invention is generally indicated at 10. Portable lathe 10 comprises a first or fixed annular ring or frame 12 having a longitudinal central axis 14. Ring 12 is divided into two halves retained together by suitable fastener means generally indicated at 16. Constructing a portable lathe of multiple pieces is conventional in the art and permits the lathe to be placed over a pipe 18 or other workpiece preparation for a machining operation. Pipe 18 is normally disposed centrally along axis 14 and ring 12 is fixed to pipe 18 by means of a plurality of clamping pads 20. As is known in the art, clamping pads 20 are radially adjustable by inserting a tool through respective bores (not shown) formed in ring 12 for locating and centering ring 12 with respect to pipe 18.

Portable lathe 10 further includes a second or rotating annular ring or carrier head 22. Ring 22 is rotatably supported by ring 12 for rotation about tool axis 14 in the manner which will be more fully described below. Ring 22 is formed with a ring gear 23 that includes gear teeth 24. Teeth 24 mesh with teeth 25 of a pinion 26 that, in turn, is usually directly driven by a suitable drive motor 28 that may be mounted on ring 12 at mounting area 30. A tool-carrier 32 is typically fastened to a forward face (towards the right as shown in FIG. 2) of ring 22. Carrier 22 functions in a manner known in the art to secure a tool element 34 for carrying out machining operations on pipe 18. Although not shown in these figures, tool element 34 can be adjusted for feeding into a workpiece in a manner known in the art such as, for example, by a conventional star wheel (not shown). The tool element position can be adjusted as well in other directions and various types of tools can be supported on the ring 22 for performing various types of cutting operations on a pipe workpiece.

Ring gear 23 in accordance with the illustrated embodiment includes a radially inner annular groove 36 having converging bearing race surfaces 37, 38. In addition, ring 12 is formed with a forward thrust surface 40.

Reference will now be made to FIGS. 3-7 in providing a detailed description of a preferred embodiment of the adjustable bearing assembly 48 of the present invention. Ring 12 is formed with a plurality (generally at least three) of circumferentially spaced bores 53 located concentrically about axis 14. In the illustrated embodiment, each bore 53 includes a first portion 55 of larger diameter and a second, reduced diameter portion 58. An annular seat 59 is thus provided between first portion 55 and second portion 58 of bore 53. Ring 22 is formed with at least one longitudinally extending aperture 63 that can be aligned with any one of bores 53 by rotating ring 22. It is to be understood that the seat 60 could simply be provided on the rear surface of frame 12 if desired and if protruding elements rearward of frame 12 was acceptable.

Each roller bearing assembly of the adjustable bearing assembly 48 comprises a unique bushing member 66 that includes an annular sleeve 68 having an inner, annular cylindrical surface 71 defining an axially extending central through hole 74. Through hole 74 is concentric with the central longitudinal axis 77 of bushing 66. While hole 74 is shown and described as extending completely through bushing 66, the hole 94 could also be a blind hole in bushing 66 if desired. The term "Through hole" is intended to be generic to either type of hole or opening. Sleeve 68 further includes an outer circumferential cylindrical surface 80 that is circular but which has a center curvature that is eccentric with respect to central longitudinal axis 77 of the bushing. The bushing 66 bearing further includes an annular flange portion 84 integrally formed with sleeve 68 and extending radially outwardly from the outer, cylindrical surface 80 so as to define a radial wall 86, and a connector portion 90. Connector portion 90 includes a longitudinally extending opening 94 that is axially aligned and concentric with central through hole 74 of sleeve 68. Opening 94 has an associated diameter which, in the preferred embodiment, is less than the diameter of central through hole 74 and the opening 94 is internally threaded at 97. Connector portion 90 also preferably includes a plurality of outer flats 100 which are adapted to receive a conventional wrench or socket tool for rotating the bushing member 66 in order to adjust each roller bearing assembly 48 as described below. Of course, any suitable arrangement may be provided for engaging and rotating the bushing 66. The bushing 66 is constructed as a one-piece integrated structural element that incorporates a bolt fastener with an eccentric bushing for enabling adjustment of the position of a bearing support bolt laterally of its longitudinal axis relative to a support member.

Each roller bearing assembly further comprises an elongated attaching bolt or shaft member 102 having a first end portion 105 defined by a diametrically enlarged head 106. Head 106, as shown in FIG. 5, is preferably formed with a socket 107 or other suitable structure for engaging a tool thereto for rotating the bolt 102. Bolt 102 further includes an intermediate portion 112 having a uniformly cylindrical outer surface 113 concentric with the longitudinal axis 113a of the bolt and a second end portion 115 which is externally threaded. Intermediate portion 112 is specifically sized or dimensioned to be snugly received concentrically within central through hole 74 of sleeve 68 and the threaded end portion 113 is adapted to be threadably engaged within opening 94 of bushing 90. By engaging attaching member 102 with a tool such as at socket 107 and bushing 66 by a tool engaging its external flats 100, it can readily seen that bolt 102 and bushing 66 can be threadedly secured together. However, the angular relationship between the bolt 102 and the eccentric surface 80 of bushing 66 is varied when the bushing is rotated relative to the bolt, while at the same time the bushing is advanced towards or moved away from the head end 106 of bolt 102 by such relative rotation. Thus, if bolt 102 is rotated relative to the bushing 66 while bushing 66 is held against rotation, the circumferential position of the eccentric surface 80 of bushing 66 will not change relative to the longitudinal axis 113a of bolt 102. However, If the rotational position of bushing 66 is changed while bolt 102 is held against rotation, it will be readily apparent that the circumferential location of the eccentric surface 80 relative to the longitudinal axis of bolt 102 will change. The significance of these relationships will become more apparent in the following description of the adjustable bearing assembly when it is mounted in position on a support element.

Figure 3:
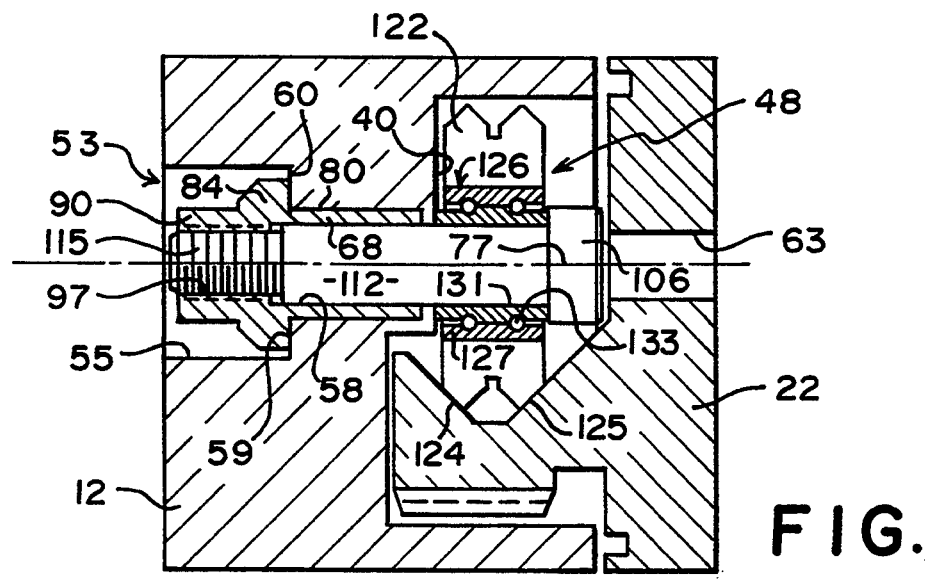
FIG. 3 is a cross-sectional view generally taken along line III—III of FIG. 1.

The roller bearing assembly 48 actually comprises a plurality of individual roller bearings, one of which is indicated in FIG. 3 at 122. Each roller bearing 122 preferably includes converging or tapered bearing surfaces 124, 125 that conform with converging bearing race surfaces 37 and 38 of annular groove 36. This arrangement provides both radial and thrust load reacting properties for the bearing arrangement whereby the roller bearing and its associated race can support and react both radial and thrust loads imposed on tool carrying ring 22. A roller bearing such as manufactured by Bishop-Wisecarver Corporation, Part No. W-3X under the trademark Dua L Vee could be used for bearing 122. While the bearing is shown as mounted on fixed ring 12, it should be understood that the bearing element could just as well be mounted on the rotatable ring 22 with the race for the bearing provided on the fixed ring 12. This would simply involve a reversal of the elements as illustrated, for example, in FIG. 3. Moreover, it should be understood that, while bearing race surfaces 124, 125 are shown as converging, they could also be formed so as to diverge outwardly from the outer circumference of the raceway towards the rotation axis of the ring 22, in which case a cooperating, similarly tapered central surface of roller element 122 would be provided to cooperate with the race surfaces. Roller bearing 122 is rotatably mounted upon a predetermined section of intermediate portion 112 of bolt 102 by means of a ball bearing 126. More specifically, ball bearing 126 includes an outer race 127 that is fixedly secured to roller bearing 122, an inner race 131 that is secured between head 106 of bolt 102 and the thrust surface 40 of ring 12 when bolt 102 is secured to connector portion 90, and a plurality of ball elements 133.

The operation and manner of adjustment of roller bearing assembly 48 will now be described in detail. As clearly shown in FIG. 3, sleeve 68 of bushing 66 is adapted to be snugly received in bore 53 until the radial wall 86 of the flange portion 84 engages annular seat 60. Once roller bearing 122 and ball bearing 126 are aligned with bore 53, bolt 102 can be inserted within bore 53 and through hole 74 so that end portion 115 is threadably engaged with the internal threads 97 of connector portion of bushing 90. Since the axis of outer cylindrical surface 80 of the sleeve portion 68 of bushing 66 is eccentric with respect to central longitudinal axis 113a of bolt 102 and axis 77 of inner surface 71, the rotational positioning of bushing 66 within bore 53 will determine the radial positioning of bolt 102 and roller bearing 122. That is, roller bearing 122 as shown in FIG. 3 can be shifted radially with respect to the frame 112, carrier head 22, and the bearing race surfaces by simply rotating the bolt 102 relative to bushing 66 to unthread the bolt slightly and then rotating bushing 66 by means of a tool engaging flats 100 of bushing 66 or by any other suitable device to locate the bolt and bearing in a desired location. The bolt may then be rotated to advance the head 106 relative to surface 40 to clamp the bearing 122 securely in place at its new location between bolt head 106 and thrust surface 40, while bushing 66 is prevented from rotated. Socket 107, of course can be readily accessed due to the presence of aperture 63 which is located opposite a bolt head 106 by rotating by rotating ring 22.

By this arrangement, roller bearing assembly 48 can be adjusted in a simple and convenient manner. In addition, it should be noted that roller bearing 122 is rotatably mounted upon intermediate portion 112 of bolt 102 which, in turn, is concentric with the axes 77 and 113a of bushing 66 and bolt 102. Therefore, the eccentric adjustment occurs within bore 53 of fixed ring 12 of this embodiment such that forces transmitted by bolt 102 during operation of portable lathe 10 can be uniformly reacted into the fixed ring 12.

Although described with respect to a preferred embodiment to the invention, it should be readily understood that various changes and/or modifications may be made to the invention without departing from the spirit thereof. For example, the adjustable bearing assembly may be utilized in any environment where adjustment of the position of a roller bearing is desired relative to a supporting structural element. While the invention is described only in the context of a machine tool and furthermore in the context of a circular bearing race, it should be understood that the bearing could be used as well with a linear race, for example between two structural elements that are movable linearly relative to each other. Moreover, while the invention in described in the context of a portable lathe, it should be understood that the bearing assembly is capable of being used in any machine tool environment or in any environment where an adjustable roller bearing is utilized. In general, the invention is only intended to be limited by the scope of the following claims.

I claim:

1. In an adjustable bearing assembly including a roller bearing, a support bolt, and a bushing for receiving the support bolt and for engaging a bore in a support member for the bearing assembly, the improvement comprising: said bushing having a central longitudinal axis and including an axially extending central through hole defining a cylindrical inner surface concentric with said longitudinal axis for receiving a support bolt, and an outer cylindrical surface that is eccentric with respect to said longitudinal axis; said bushing including an integral flange portion that extends radially beyond said outer cylindrical surface of said bushing and an integral connector portion including a longitudinally extending internally threaded opening located concentrically with said longitudinal axis, said bushing including a portion adapted to be engaged by a device for rotating said bushing about said longitudinal axis, whereby rotation of the bushing in a bore in a support member causes the longitudinal axis of the bushing to be radially moved relative to the support member.

2. The improvement as claimed in claim 1, wherein the bushing has axially opposed ends and said flange portion is positioned intermediate the ends.

3. The improvement as claimed in claim 1, wherein said threaded opening has an associated diameter that is less than the diameter of sale central through hole.

4. The improvement as claimed in claim 1, further comprising:
    said support bolt including a longitudinal axis, a head end portion, an intermediate cylindrical portion concentric with the bolt longitudinal axis, and an axially threaded end portion opposite said head portion, said cylindrical portion being dimensioned to fit snugly within the central through hole of said bushing and said threaded portion being sized to be threadably received within said opening of the connector portion of said bushing, said head end of the bolt adapted to engage a roller bearing and the flange portion of the bushing adapted to engage a support member, whereby rotation of the bolt relative to the bushing in opposite directions or rotation causes the bolt head to advance towards or withdraw away from said flange portion of said bushing.

5. The improvement as claimed in claim 4, further comprising:
    said cylindrical portion of said support bolt being adapted to receive and support a roller bearing for rotation about said bolt longitudinal axis, 6. A machine tool comprising:
    a fixed frame and a tool carrier head rotatably mounted on the frame for rotation about a tool rotation axis, roller bearing elements extending between the frame and head, with either the frame or head including apertures for receiving bearing support bolts;
    bearing support bolts extending through said apertures and securing the roller bearing elements relative to either said frame or head, said bolts each having a central longitudinal axis, a head end, a central cylindrical portion concentric with the bolt longitudinal axis, and an opposed threaded end;

a bushing associated with each support bolt, each bushing including a bushing longitudinal axis, an inner cylindrical through hole concentric with the bushing longitudinal axis that closely fits over the bolt cylindrical portion in coaxial relationship with the bolt longitudinal axis, a connector portion including an internally threaded bore that extends coaxially with the bolt longitudinal axis and that threadably engages the bolt threaded end, said bushing cylindrical through hole located between the roller bearing and the connector portion of the bushing, an outer cylindrical portion that is eccentric relative to said bushing longitudinal axis, said outer cylindrical portion disposed in close fitting relationship with a bore in said frame or head, and a radial flange portion for engaging a surface of the head or frame on the side thereof opposite the roller bearing associated with the support bolt connected to the bushing; said bushing adapted to be rotated in its respective bore to thereby cause the bolt longitudinal axis to be translated laterally relative to the bore due to the eccentricity between the bushing cylindrical outer surface and the longitudinal axis; and said bushing, including said connector portion, outer cylindrical portion and flange portion constituting a one-piece structural element;

said bolt head end arranged to clamp a respective roller bearing between itself and the frame or head when the bolt is threaded inwardly relative to the bushing connector portion.

7. A machine tool as claimed in claim 6, wherein said flange portion is located intermediate the portion of the bushing including the connector portion and the cylindrical outer surface of the bushing.

8. A machine tool as claimed in claim 6, said bushing including means for engaging a bushing rotating tool adjacent the connector portion.

9. A machine tool as claimed in claim 6, said bolt head end including means for engaging a bolt rotating tool.

10. A machine tool as claimed in claim 6, said bushing including means for engaging a bushing rotating tool adjacent the connector portion, and said bolt head end including means for engaging a bolt rotating tool.

11. A machine tool as claimed in claim 6, said roller bearing including opposing inclined circumferential bearing surfaces, and said frame or head not supporting the roller bearing including opposing inclined bearing race surfaces for engaging the bearing surfaces of the roller bearing, each roller bearing being supported by a respective support bolt to rotate about an axis extending parallel to the tool rotation axis whereby each roller bearing reacts both axial and radial loads imposed on the bearing by the carrier head.

* * * * *